June 9, 1964
O. HELLER
3,136,877
ELECTRONIC THERMOSTATIC SYSTEM
Filed June 25, 1962
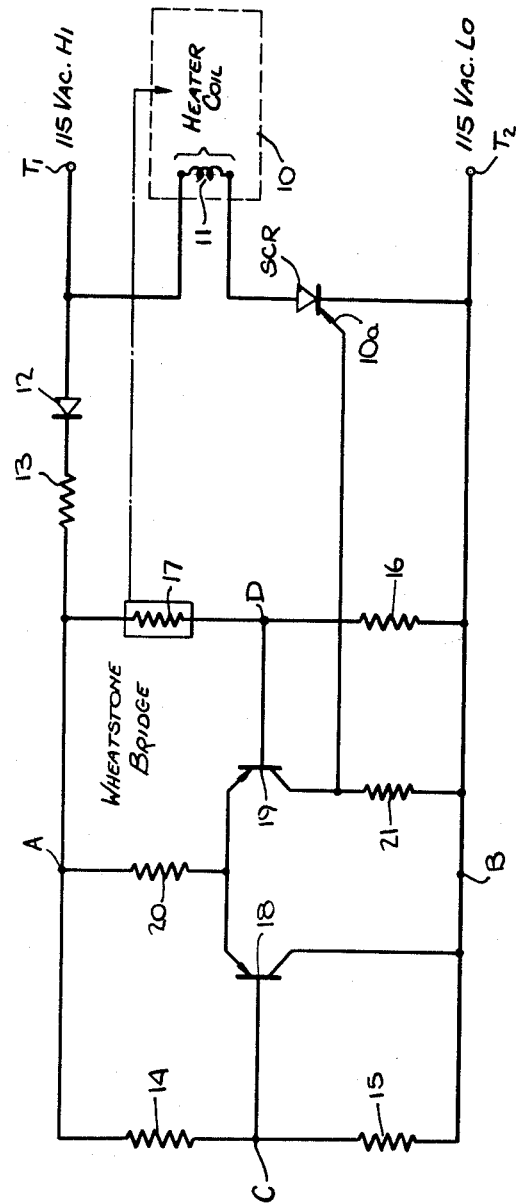
INVENTOR.
OSCAR HELLER
BY
Michael Ebert
ATTORNEY 3,136,877
ELECTRONIC THERMOSTATIC SYSTEM
Oscar Heller, Brooklyn, N.Y., assignor to Bulova Watch Company, Inc., New York, N.Y., a corporation of New York
Filed June 25, 1962, Ser. No. 204,715
2 Claims. (Cl. 219—499)

This invention relates generally to thermal regulating systems, and more particularly to an electronic thermostat for automatically and efficiently controlling a heating unit.

Heating devices and ovens are ordinarily controlled by means of mechanical thermostats constituted by bi-metallic elements which flex in response to heat changes intermittently to open and close an electric switch connected in the electric control circuit of the heater to maintain a predetermined temperature level. Thermostats of conventional design are relatively slow to respond and because of the repeated mechanical switching actions, have a limited operative life. The contacts tend to erode with use and to accumulate dirt which renders the operation unreliable.

Accordingly, it is the principal object of the invention to provide an electronic thermostatic circuit having an extended life and improved reliability.

More specifically, it is an object of this invention to provide an electronic thermostatic system composed entirely of solid-state elements, the system being highly sensitive to ambient temperature and being adapted to effect make-and-break electronic switching actions to control the operation of a heater unit within close limits.

Also an object of the invention is to provide an electronic thermostat which may be manufactured at low cost and in highly compact form.

Briefly stated, these objects are accomplished by means of a silicon-controlled rectifier switch connected in series with a heater element in an A.-C. supply, the rectifier being fired during positive half-cycles of the supply by means of a control voltage derived from the output diagonals of a bridge circuit across whose input diagonals the A.-C. supply is also supplied in rectified half-wave form. The bridge circuit includes a temperature-sensitive resistor which is exposed to heat from said heater element to vary the output of the bridge accordingly, thereby causing the control voltage to fire said rectifier switch intermittenaly in a manner governing the operation of said heater element.

For a better understanding of the invention, as well as other objects and further features thereof, reference is made to the following detailed description to be read in conjunction with the accompanying drawing whose single figure is a schematic diagram of the electronic thermostat in accordance with the invention.

Referring now to the drawing, there is shown a heating system in the form of an oven 10, heated by means of an electrical heater coil 11 or other electrically energized heating units. Power for the coil is taken from an alternating-current supply connected at terminals $T_1$ and $T_2$, the coil being connected thereto in series with a silicon-controlled rectifier switch SCR. This rectifier switch is constituted effectively by a silicon solid-state diode having a control electrode 10a which, when a voltage of a predetermined value is applied thereto, renders the diode conductive in its forward direction. Thus the rectifier switch is capable of conducting only during the positive half-cycle of the applied A.-C. when fired or triggered by a control voltage of proper magnitude imposed on its control electrode.

The A.-C. voltage at terminals $T_1$ and $T_2$ is also applied through a half-wave diode rectifier 12 in series with an attenuating resistor 13 across the input diagonals A—B of a Wheatstone bridge. The bridge is composed of four arms formed by resistors 14, 15, 16 and 17. Resistors 14, 15 and 16 are selected to have extremely low temperature coefficients, whereas resistor 17 has a temperature-sensitive characteristic. For this purpose a thermistor may be used, which is a solid semiconductor having a high negative temperature coefficient of resistance. Resistor 17 is positioned within the oven and its resistance varies with changes in oven temperature, while the other resistors maintain their constant values.

The voltage developed at the output diagonals C—D of the bridge is sensed and amplified by means of a differential amplifier constituted by a pair of transistors 18 and 19 whose bases are connected to points C and D respectively, and whose emitter electrodes are joined and connected through resistor 20 to point A of the bridge. The collector electrode of transistor 18 is connected directly to point B, while the collector electrode of transistor 19 is connected through output resistor 21 to point B of the bridge.

Thus the two transistors are operated by the rectified half-wave pulses applied to the input diagonals of the bridge, and the control voltage established at the output resistor 21 reflects the voltage difference between the output diagonals C and D as determined by variations in the temperature-sensitive resistor 17. This control voltage is applied to the control or gate electrode 10a of the rectifier switch SCR.

In operation, as the temperature inside oven 10 decreases below a predetermined value, the resistance of the resistor 17 rises, thereby devoloping a control voltage of a magnitude which triggers switch SCR on each positive half of the sinusoidal input wave, to pass current through heater coil 11 during each half cycle. As the oven temperature increases above said predetermined value, the resistance of resistor 17 falls, thereby dropping the magnitude of control voltage below the firing level of switch SCR. Switch SCR is now in the off position and no current flows through the heater coil. It will be seen that a closed loop temperature control is thereby effected and the heater is intermittently energized to maintain the oven temperature at the desired value.

The operation of the system is such that the bridge and the amplifier all function only during positive half cycles of the supply voltage. This is advantageous in that the switch SCR operates only on the positive half cycles, and there is no necessity therefore, for the control system to operate during the negative half cycles. Hence no circuit dissipation occurs on the negative portion of the input sine wave, and the efficiency of the system is maintained at a high level.

The system may be adjusted for maintaining the oven at different temperature levels by the use of a calibrated variable resistor in one of the bridge arms adapted to set the control system for different switch firing points. It will be appreciated that the solid state rectifier switch SCR acts essentially as an on-off switch, and once fired does not change its conductivity in response to variations in control voltage above the firing level.

While there has been shown what is considered to be a preferred embodiment of the invention, it will be understood that many changes may be made therein without departing from the essential spirit of the invention as defined in the annexed claims.

What is claimed is:

1. An electronic thermostatic system for an alternating-current supply feeding a heater element disposed within an oven, comprising a silicon-controlled rectifier switch connected in series with said heater element and said supply to pass current thereto during positive half cycles of said supply, said switch having a control electrode to trigger said switch, a bridge circuit composed of four resistor arms, one resistor being disposed in said oven and being temperature-sensitive, the other resistors having constant values, means to apply said alternating current from said supply across the input diagonals of said bridge, a differential amplifier constituted by a pair of transistors each having a base, an emitter and a collector electrode, the bases thereof being connected between the output diagonals of said bridge, means connecting the emitter electrodes of said transistors to one input diagonal of said bridge, means connecting the collector electrode of one transistor to the other input diagonal of said bridge and the collector electrode of the other transistor through an output resistor to said input diagonal, and means applying the voltage developed across said output resistor to said control electrode to provide a firing voltage for said switch to render it intermittently operative thereby to regulate the heat in said oven.

2. An electronic thermostatic system for an alternating-current supply feeding a heater element disposed within an oven, comprising a silicon-controlled rectifier switch connected in series with said heater element and said supply to pass current thereto during positive half cycles of said supply, said switch having a control electrode to trigger said switch, a bridge circuit composed of four resistor arms, one resistor being disposed in said oven and being temperature-sensitive, the other resistors having constant values, means including a diode in series with a resistor to apply said alternating current across the input diagonals of said bridge whereby said bridge is operated by half wave pulses, a differential amplifier constituted by a pair of transistors each having a base, an emitter and a collector electrode, the bases thereof being connected between the output diagonals of said bridge, means connecting the emitter electrodes of said transistors to one input diagonal of said bridge, means connecting the collector electrode of one transistor to the other input diagonal of said bridge and the collector electrode of the other transistor through an output resistor to said other input diagonal, and means applying the voltage developed across said output resistor to said control electrode to provide a firing voltage for said switch to render it intermittently operative thereby to regulate the heat in said oven.

References Cited in the file of this patent
UNITED STATES PATENTS

| | | |
|---|---|---|
| 3,042,782 | Bray | July 3, 1962 |
| 3,109,910 | Fogleman | Nov. 5, 1963 |

OTHER REFERENCES

Electronics-Eng. Edition, March 28, 1958, pages 52–55, Solid-State Thyratron Switches Kilowatts: by R. P. Frenzel and F. W. Gutzwiller.